(12) United States Patent
Lai et al.

(10) Patent No.: US 11,620,814 B2
(45) Date of Patent: Apr. 4, 2023

(54) CONTEXTUAL GROUNDING OF NATURAL LANGUAGE PHRASES IN IMAGES

(71) Applicant: NEC Laboratories America, Inc., Princeton, NJ (US)

(72) Inventors: Farley Lai, Plainsboro, NJ (US); Asim Kadav, Jersey City, NJ (US); Ning Xie, Fairborn, OH (US)

(73) Assignee: NEC Corporation

( * ) Notice: Subject to any disclaimer, the term of this patent is extended or adjusted under 35 U.S.C. 154(b) by 256 days.

(21) Appl. No.: 17/014,984

(22) Filed: Sep. 8, 2020

(65) Prior Publication Data

US 2021/0081728 A1 Mar. 18, 2021

Related U.S. Application Data

(60) Provisional application No. 62/899,307, filed on Sep. 12, 2019.

(51) Int. Cl.
| | | |
|---|---|---|
| *G06V 10/70* | (2022.01) | |
| *G06F 40/205* | (2020.01) | |
| *G06F 40/284* | (2020.01) | |
| *G06N 20/00* | (2019.01) | |
| *G06N 3/08* | (2006.01) | |
| *G06K 9/62* | (2022.01) | |
| *G06V 10/20* | (2022.01) | |

(52) U.S. Cl.
CPC .......... *G06V 10/768* (2022.01); *G06F 40/205* (2020.01); *G06F 40/284* (2020.01); *G06K 9/6217* (2013.01); *G06N 3/08* (2013.01); *G06N 20/00* (2019.01); *G06V 10/255* (2022.01)

(58) Field of Classification Search
CPC .... G06V 10/768; G06V 10/255; G06V 10/82; G06V 20/00; G06F 16/53; G06F 40/205; G06F 40/284; G06F 16/583; G06K 9/6217; G06K 9/6274; G06N 3/08; G06N 20/00; G06N 3/0445; G06N 3/0454; G06N 3/0472; G06N 3/084
USPC .......................................................... 707/69
See application file for complete search history.

(56) References Cited

U.S. PATENT DOCUMENTS

| | | | | |
|---|---|---|---|---|
| 10,383,586 | B2 * | 8/2019 | Allinson | A61N 5/1077 |
| 10,592,767 | B2 * | 3/2020 | Trott | G06V 10/40 |
| 2007/0269460 | A1 * | 11/2007 | Inchauspe | A61P 31/00 424/228.1 |
| 2012/0303562 | A1 * | 11/2012 | Paguio | G11B 5/3163 706/19 |
| 2018/0314715 | A1 * | 11/2018 | Ramesh | G06T 7/97 |
| 2019/0130206 | A1 * | 5/2019 | Trott | G06V 20/60 |
| 2019/0266236 | A1 * | 8/2019 | Battach | G06N 3/0454 |
| 2020/0143211 | A1 * | 5/2020 | Lai | G06V 20/43 |
| 2020/0250398 | A1 * | 8/2020 | Courtiol | G06V 20/698 |
| 2020/0302168 | A1 * | 9/2020 | Vo | H04N 7/183 |
| 2021/0081728 | A1 * | 3/2021 | Lai | G06V 10/82 |
| 2021/0293729 | A1 * | 9/2021 | Connell | G01N 33/24 |

* cited by examiner

*Primary Examiner* — Ashish Thomas
*Assistant Examiner* — Abdullah A Daud
(74) *Attorney, Agent, or Firm* — Joseph Kolodka

(57) ABSTRACT

Aspects of the present disclosure describe systems, methods and structures providing contextual grounding—a higher-order interaction technique to capture corresponding context between text entities and visual objects.

4 Claims, 3 Drawing Sheets

CONTEXTUAL GROUNDING OF NATURAL LANGUAGE PHRASES IN IMAGES

CROSS REFERENCE

This disclosure claims the benefit of U.S. Provisional Patent Application Ser. No. 62/899,307 filed Sep. 12, 2019 the entire contents of which is incorporated by reference as if set forth at length herein.

TECHNICAL FIELD

This disclosure relates generally to language text and images. More particularly, it describes techniques for corresponding language text with visual objects included in images.

BACKGROUND

Language grounding is a fundamental task to address visual reasoning challenges that require understanding the correspondence between text entities and objects in images. One straightforward, real-world application of language grounding—is a natural language retrieval system that takes as input a textual query and returns as output a visual object in a given image referred to by the language entity in the query. Notwithstanding such great need and utility, automated systems, methods, and structures that perform language grounding present significant technical challenges not yet met in the art.

SUMMARY

An advance in the art is made according to aspects of the present disclosure directed to systems, methods, and structures that provide contextual grounding of natural language entities in images.

In sharp contrast to the prior art, systems, methods, and structures according to aspects of the present disclosure introduce a novel architecture that advantageously captures a context of corresponding text entities and image regions thereby improving grounding accuracy.

In further contrast to the prior art, systems, methods, and structures according to aspects of the present disclosure introduces a contextual grounding approach that captures the context in corresponding text and images respectively without any specific embedding or object feature extraction.

Operationally, our architecture disclosed herein accepts pre-trained text token embeddings and image object features from an object detector as input. method d. Additional encoding that captures positional and spatial information can be added to enhance the feature quality. Separate text and image branches facilitate respective architectural refinements for different modalities. The text branch is pre-trained on a large-scale masked language modeling task while the image branch is trained from scratch.

Our model learns contextual representations of the text tokens and image objects through layers of high-order interaction, respectively. A final grounding head ranks a correspondence between the textual and visual representations through cross-modal interaction.

Finally, in our evaluation, we show that our model achieves the state-of-the-art grounding accuracy of 71.36% over the Flickr30K Entities dataset. No additional pre-training is necessary to deliver competitive results compared with related work that often requires task-agnostic and task-specific pre-training on cross-modal datasets.

BRIEF DESCRIPTION OF THE DRAWING

A more complete understanding of the present disclosure may be realized by reference to the accompanying drawing in which.

Figure 1:
FIG. 1 is a schematic diagram illustrating an example image from Flickr30K entities annotated with bounding boxes corresponding to entities in the caption.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that cross-model reasoning is challenging for grounding entities and objects in different modalities such as text and images. Representative tasks include visual question answering (VQA) and image captioning that leverages grounded features between text and images to make predictions.

While recent advances in these tasks achieve impressive results, the quality of the correspondence between textual entities and visual objects in both modalities is neither convincing nor interpretable. This is likely because the grounding from one modality to the other is trained implicitly and any intermediate results are not often evaluated as explicitly as in object detection.

To address this issue, the Flickr30K Entities dataset with precise annotations of the correspondence between language phrases and image regions to ease the evaluation of visual grounding was created.

FIG. 1 is a schematic diagram illustrating an example image from Flickr30K entities annotated with bounding boxes corresponding to entities in the caption. In that figure, two men are referred to as separate entities. To uniquely ground the two men in the image, a grounding algorithm must take respective context and attributes into consideration for learning the correspondence.

Historically over the years, many deep learning based approaches were proposed to tackle this localization challenge. The basic idea behind such approaches is to derive representative features for each entity as well as object, and then score their correspondence. In the modality of caption input, individual token representations usually start with the word embeddings followed by a recurrent neural network (RNN), usually Long Short-Term Memory (LSTM) or Gated Recurrent Units (GRU), to capture the contextual meaning of the text entity in a sentence. On the other hand, the visual objects in image regions of interest (RoI) are extracted through object detection.

Each detected object typically captures limited context through the receptive fields of 2D convolutions. Advanced techniques such as the feature pyramid network (FPN) enhance the representations by combining features at different semantic levels w.r.t. the object size. Even so, those conventional approaches are limited to extracting relevant long range context in both text and images effectively. In view of this limitation, non-local attention techniques have been proposed to address the long range dependencies in natural language processing (NLP) and computer vision (CV) tasks.

Inspired by this advancement, we introduce the contextual grounding approach to improving the representations through extensive intra- and inter-modal interaction to infer the contextual correspondence between text entities and visual objects.

Related Work. On the methodology of feature interaction, the Transformer architecture for machine translation demonstrates a systematic approach to efficiently computing the interaction between language elements. Around the same time, non-local networks generalize the transformer to the CV domain, supporting feature interaction at different levels of granularity from feature maps to pooled objects.

Recently, the image transformer adapts the original transformer architecture to the image generation domain by encoding spatial information in pixel positions while we deal with image input at the RoI level for grounding. Additionally, others have proposed BERT (Bidirectional Encoder Representations from Transformers) as a pre-trained transformer encoder on large-scale masked language modeling, facilitating training downstream tasks to achieve state-of-the-art (SOTA) results.

As we shall show and describe, our work extends BERT to the cross-modal grounding task by jointly learning contextual representations of language entities and visual objects. Coincidentally, another line of work named VisualBERT also integrates BERT to deal with grounding in a single transformer architecture. However, their model requires both task-agnostic and task-specific pre-training on cross-modal datasets to achieve competitive results. Ours, on the contrary, achieves SOTA results without additional pre-training and allows respective architectural concerns for different modalities.

Contextual Grounding

The main approach of the prior art uses RNN/LSTM to extract high level phrase representations and then apply different attention mechanisms to rank the correspondence to visual regions. While the hidden representations of the entity phrases take the language context into consideration, the image context around visual objects is in contrast limited to object detection through 2D receptive fields. Nonetheless, there is no positional ordering as in text for objects in an image to go through the RNN to capture potentially far apart contextual dependencies.

In view of the recent advances in NLP, the transformer architecture addresses the long range dependency through pure attention techniques. Without RNN being incorporated, the transformer enables text tokens to efficiently interact with each other pairwise regardless of the range. The ordering information is injected through additional positional encoding. Enlightened by this breakthrough, the corresponding contextual representations of image RoIs may be derived through intra-modal interaction with encoded spatial information.

Figure 2:
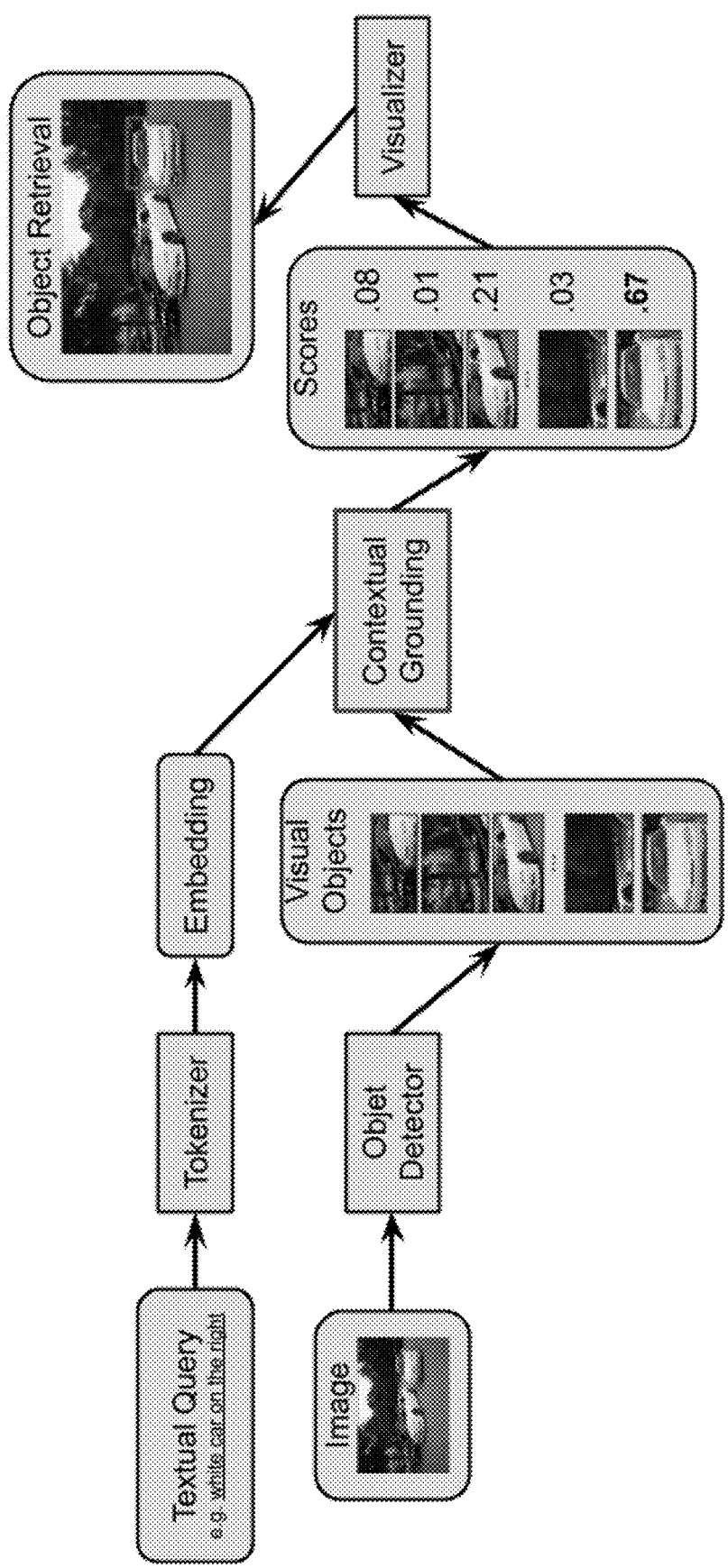
FIG. 2 is a schematic diagram illustrating a natural language object retrieval system diagram according to aspects of the present disclosure.

FIG. 2 is a schematic diagram illustrating a natural language object retrieval system diagram according to aspects of the present disclosure. With reference to that figure, it may be observed that the contextual ground module is depicted as a functional block.

Access to such a system is achieved through—for example—a computer browser that shows an input field for a user to type a query w.r.t. an image and renders retrieval results in an image. Accordingly, input to the system is a pair of textual query(ies) and image(s).

The query is parsed into tokens and applied (fed) into an object detector to locate salient regions as visual object candidates for subsequent grounding. The contextual grounding module accepts both entity embeddings and visual object representations as input and scores their correspondences in probabilities. Finally, the object corresponding to the query language entity with the highest probability score is retrieved and visualized in a bounding box to the user.

Figure 3:
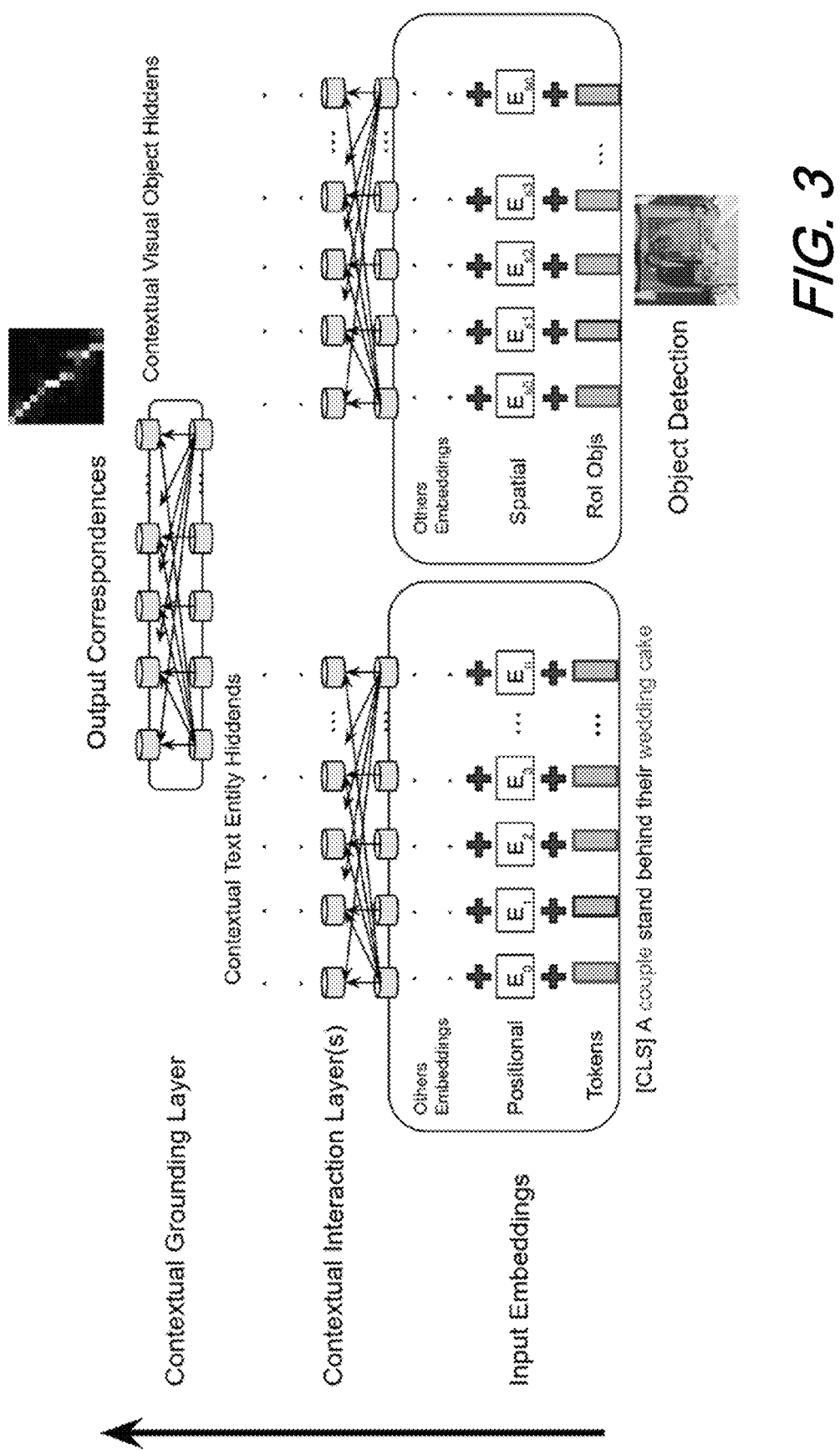
FIG. 3 is a schematic diagram illustrating contextual grounding architecture and workflow according to aspects of the present disclosure.

FIG. 3 is a schematic diagram illustrating contextual grounding architecture and workflow according to aspects of the present disclosure.

According to aspects of the present disclosure, the grounding objective guides the attention to the corresponding context in both the text and image with improved accuracy. Consequently, we describe contextual grounding architecture as shown in FIG. 3.

As we shall describe in greater detail, inside the contextual grounding module shown above, each input entity embedding vectors and visual objects go through multiple contextual interaction layers to attend to each other in the same modality such that the resulting representations involve features from the context. To further improve the performance, additional encoding features may be added such as positional encoding to add order information to textual entities in the query, and the spatial encoding to add the locations information of visual objects in the image. Lastly, the contextual grounding layer ranks the contextual entity as well as visual object representations pairwise, and output the resulting scores.

As shown in that figure, the model is composed of two transformer encoder branches for both text and image inputs to generate their respective contextual representations for the grounding head to decide the correspondence. The text branch is pre-trained from the BERT base model which trains a different positional embedding from the original transformer. On the other hand, the image branch takes RoI features as input objects from an object detector.

Correspondingly, we train a two layer multi-layer perceptron (MLP) to generate the spatial embedding given the absolute spatial information of the RoI location and size normalized to the entire image. Both branches add the positional and spatial embedding to the tokens and RoIs respectively as input to the first interaction layer. At each layer, each hidden representation performs self-attention to each other to generate a new hidden representation as layer output. The self-attention may be multi-headed to enhance the representativeness. At the end of each branch, the final hidden state is fed into the grounding head to perform the cross-modal attention with text entity hidden states as queries and image object hidden representations as the keys. The attention responses serve as the matching correspondences. If the correspondence does not match the ground truth, the mean binary cross entropy loss per entity is back propagated to guide the interaction across the branches. We evaluate the grounding recall on the Flickr30K Entities dataset and compare the results with SOTA work in the next section.

Evaluation

Our contextual grounding approach uses the transformer encoder to capture the context in both text entities and image objects. While the text branch is pre-trained from BERT, the image branch is trained from scratch. In view of the complexity of the transformer, previous work has shown that performance varies with different numbers of interaction layers and attention heads. Also, the intra-modal object interaction does not necessarily consider the relationship in space unless some positional or spatial encoding is applied. In our evaluation, we vary both the number of layers and heads, along with adding the spatial encoding to explore the performance variations summarized in Table 1.

We achieve the SOTA results in all top 1, 5 and 10 recalls based on the same object detector as used by previous SOTA BAN. The breakdown of per entity type recalls is given in Table 2. As may be observed therein, six out of the eight entity type recalls benefit from our contextual grounding. Interestingly, the recall of the instrument type suffers. This may be due to the relatively small number of instrument instances in the dataset preventing the model from learning the context well.

On the other hand, compared with the text branch consisting of 12 layers and 12 heads with hidden size of 768 dimensions, the best performance is achieved with the image branch having 1 layer, 2 attention heads and hidden size of 2048 dimensions. Moreover, adding the spatial embedding consistently improves the accuracy by 0.5% or so. This is likely because image objects, unlike word embedding requiring the context to produce representative hidden states for its meaning, may already capture some neighborhood information through receptive fields.

Finally, in Table 3, we compare the results with the recent work in progress, VisualBERT, which also achieves improved grounding results based on a single transformer architecture that learns the representations by fusing text and image inputs in the beginning. Marginally, ours performs better in the top 1 recall.

Note that advantageously our approach according to aspects of the present disclosure—unlike VisualBERT which requires task-agnostic and task-specific pre-training on COCO captioning and the target dataset—needs no similar pre-training to deliver competitive results. In addition, our architecture is also flexible to adapt to different input modalities, respectively.

TABLE 1

| Model | Detector | R@1 | R@5 | R@10 | Upper Bound |
|---|---|---|---|---|---|
| #1 | Fast RCNN | 50.89 | 71.09 | 75.73 | 85.12 |
| #2 | YOLOv2 | 53.97 | — | — | — |
| #3 | Query-Adaptive RCNN | 65.21 | — | — | — |
| #4 | Bottom-Up [1] | 69.69 | 84.22 | 86.35 | 87.45 |
| Ours L1-H2-abs | Bottom-Up [1] | 71.36 | 84.76 | 86.49 | 87.45 |
| Ours L1-H1-abs | Bottom-Up [1] | 71.21 | 84.84 | 86.51 | 87.45 |
| Ours L1-H1 | Bottom-Up [1] | 70.75 | 84.75 | 86.39 | 87.45 |
| Ours L3-H2-abs | Bottom-Up [1] | 70.82 | 84.59 | 86.49 | 87.45 |
| Ours L3-H2 | Bottom-Up [1] | 70.39 | 84.68 | 86.35 | 87.45 |
| Ours L6-H4-abs | Bottom-Up [1] | 69.71 | 84.10 | 86.33 | 87.45 |

TABLE 2

| Model | People | Clothing | Body Parts | Animals | Vehicles | Instruments | Scene | Other |
|---|---|---|---|---|---|---|---|---|
| # 1 | 64.73 | 46.88 | 17.21 | 65.83 | 68.75 | 37.65 | 51.39 | 31.77 |
| # 2 | 68.71 | 46.83 | 19.50 | 70.07 | 73.75 | 39.50 | 60.38 | 32.45 |
| # 3 | 78.17 | 61.99 | 35.25 | 74.41 | 76.16 | 56.69 | 68.07 | 47.42 |
| # 4 | 79.90 | 74.95 | 47.23 | 81.85 | 76.92 | 43.00 | 68.69 | 51.33 |
| Ours L1-H2-abs | 81.95 | 76.5 | 46.27 | 82.05 | 79.0 | 35.8 | 70.23 | 53.53 |
| # of instances | 5656 | 2306 | 523 | 518 | 400 | 162 | 1619 | 3374 |

TABLE 3

| Model | R@1 Dev Test | R@5 Dev Test | R@10 Dev Test | Upper Bound Dev Test |
|---|---|---|---|---|
| VisualBERT w/o COCO Pre-training | 68.07- | 83.98- | 86.24- | 86.97 87.45 |
| VisualBERT | 70.40 71.33 | 84.49 84.98 | 86.31 86.51 | |
| Ours L1-H2-abs | 69.8 71.36 | 84.22 84.76 | 86.21 86.49 | 86.97 87.45 |

Note that advantageously our approach according to aspects of the present disclosure—unlike VisualBERT which requires task-agnostic and task-specific pre-training on COCO captioning and the target dataset—needs no similar pre-training to deliver competitive results. In addition, our architecture is also flexible to adapt to different input modalities, respectively.

To summarize, those skilled in the art will appreciate that systems, methods, and structures according to aspects of the present disclosure advantageously improves the performance of grounding module(s) by matching relevant textual entities with corresponding visual objects. As will be further understood and appreciated—with respect to the present disclosure—there are two branches accepting the textual entity embeddings and visual object representations respectively which are later ranked by the correspondences following the steps below.

First, the two branches assume the input of the textual query and image is preprocessed and converted to some embeddings and object representations. In particular, the input query is tokenized in words or smaller tokens to extract language entity embeddings as the text branch input. Advantageously, additional information such as the positional encoding may be used to enrich the order information of the sequence of tokens. The encoding can be derived and trained from absolute 1D or relative positions of each other and the encoding may be applied to the input elements and/or attention across subsequent contextual interaction layers. The input visual objects are extracted by some object detector that provides object features as the image branch input wherein additional information such as spatial encoding may be used to distinguish the spatial relationships between different visual objects; the encoding can be derived and trained from absolute 2D relative locations to each other; and the encoding may be applied to the input elements and/or attention across the subsequent contextual interaction layers;

Second, each branch is then followed by one or more contextual interaction layers where the input elements from the same modality attend to each other to capture relevant context as the layer output representations.

Third, all pairs of the last layer language entity embeddings and visual object representations are scored to rank their correspondences as the grounding output in probabilities.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for text-image retrieval including text and image branches, said method comprising:
  receiving as input a text query and an image;
  parsing the input text query into tokens and converting them to entity embedding vectors;
  locating visual object candidates in the input image;
  scoring correspondences between the entity embeddings and visual object candidates;
  providing, visualized in a bounding box, the object corresponding to the query text entity with the highest probability score, to a user of the system;
  pre-training the text branch utilizing a BERT, Bidirectional Encoder Representations from Transformers, base model;
  receiving, by the image branch, region of interest (RoI) features as input objects from an object detector;
  training, a two-layer multi-layer perceptron (MLP) to generate spatial embedding given absolute spatial information of the RoI location and size normalized to the entire image;
  adding, by both branches, positional and spatial embedding to tokens and RoIs respectively as input to a first interaction layer of the MLP; and
  performing, at each layer of the MLP, self-attenuation by each hidden representation to each other to generate a new hidden representation as layer output;
  wherein no specific embedding or object feature extraction is used in the method.

2. The method of claim 1 further comprising:
  providing, at the end of each branch, a final hidden state to a ground head to provide cross-modal attention responses with text entity hidden states as queries and image object hidden representations as keys.

3. The method of claim 2 wherein matching correspondences are determined from the attention responses.

4. The method of claim 3 further comprising
  back propagating a mean binary cross entropy loss per entity if the correspondence(s0 does not match a ground truth.

* * * * *